United States Patent
Arndt et al.

(10) Patent No.: US 7,493,526 B2
(45) Date of Patent: Feb. 17, 2009

(54) SYSTEM AND METHOD FOR SUPPORTING DEBUGGING OF HOST CHANNEL ADAPTERS IN A LOGICAL PARTITIONING

(75) Inventors: Richard L. Arndt, Austin, TX (US); Charles W. Gainey, Jr., Poughkeepsie, NY (US); Carol B. Hernandez, Austin, TX (US); Donald W. Schmidt, Stone Ridge, NY (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 11/452,172

(22) Filed: Jun. 13, 2006

(65) Prior Publication Data

US 2008/0010551 A1  Jan. 10, 2008

(51) Int. Cl.
*G06F 11/00* (2006.01)

(52) U.S. Cl. .......................................... 714/45; 717/128

(58) Field of Classification Search ............. 714/45
See application file for complete search history.

(56) References Cited

U.S. PATENT DOCUMENTS

| | | | |
|---|---|---|---|
| 5,513,317 A * | 4/1996 | Borchardt et al. | 714/45 |
| 5,751,942 A * | 5/1998 | Christensen et al. | 714/38 |
| 6,457,144 B1 * | 9/2002 | Eberhard | 714/45 |
| 6,813,731 B2 * | 11/2004 | Zahavi et al. | 714/45 |
| 7,089,453 B2 * | 8/2006 | Miyamoto | 714/37 |
| 7,200,776 B2 * | 4/2007 | Harris | 714/45 |
| 7,370,240 B2 * | 5/2008 | Dawkins et al. | 714/45 |

* cited by examiner

Primary Examiner—Scott T. Baderman
Assistant Examiner—Paul F. Contino
(74) Attorney, Agent, or Firm—Libby Z. Handelsman; Dillon & Yudell LLP

(57) ABSTRACT

A method, system, and computer-usable medium for supporting debugging of host channel adapters in a logical partitioning environment. In a preferred embodiment of the present invention, a hypervisor acquires control of a trace facility and sets trace parameters for the host channel adapter. In response to determining a trace event that matches said trace parameter has been triggered, the hypervisor retrieves trace information from a buffer. In response to determining the buffer does not include any more trace information, the hypervisor determines if modification of the trace parameters is required. If the modification of the trace parameters is required, the hypervisor alters the trace parameters in anticipation of another trace event.

1 Claim, 3 Drawing Sheets

SYSTEM AND METHOD FOR SUPPORTING DEBUGGING OF HOST CHANNEL ADAPTERS IN A LOGICAL PARTITIONING

BACKGROUND OF THE INVENTION

1. Technical Field

The present invention relates in general to the field of data processing systems. More particularly, the present invention relates to the field of implementing data processing systems in a logical partitioning environment. Still more particularly, the present invention relates to a system and method for supporting debugging of host channel adapters in a logical partitioning environment.

2. Description of the Related Art

InfiniBand was originally envisioned as a comprehensive "System Area Network" that would connect CPUs and provide all high speed I/O for "back-office" applications. In this role it would potentially replace just about every datacenter I/O standard including peripheral component interconnect (PCI) and various networks like Ethernet. Instead, all of the CPUs and peripherals would be connected into a single pan-datacenter switched InfiniBand fabric. This vision offered a number of advantages in addition to greater speed, not the least of which is that I/O workload would be largely lifted from computer and storage. In theory, this should make the construction of clusters much easier, and potentially less expensive, because more devices could be shared and they could be easily moved around as workloads shifted. Proponents of a less comprehensive vision saw InfiniBand as a pervasive, low latency, high bandwidth, low overhead interconnect for commercial datacenters, albeit one that might perhaps only connect servers and storage to each other, while leaving more local connections to other protocols and standards such as PCI.

A host channel adapter (HCA) provides a computer system with a port connection with other InfiniBand devices. The port may be coupled to another HCA, a target device, or an InfiniBand switch fabric that redirects data among the components of the computer system.

A HCA adapter includes resources and controls that affect the adapter as whole and a pool of resources with their corresponding controls that can be allocated to different operating system (OS) images in a logical partitioning environment. One of the adapter-wide resources offered is a facility to generate traces. Since the adapter may be shared by more than one OS image, only the hypervisor is allowed access and control over the adapter's trace facility. Therefore, there is a need for a system and method for presenting the adapter's tracing capabilities to an OS image for debug support.

SUMMARY OF THE INVENTION

The present invention includes a A method, system, and computer-usable medium for supporting debugging of host channel adapters in a logical partitioning environment. In a preferred embodiment of the present invention, a hypervisor acquires control of a trace facility and sets trace parameters for the host channel adapter. In response to determining a trace event that matches said trace parameter has been triggered, the hypervisor retrieves trace information from a buffer. In response to determining the buffer does not include any more trace information, the hypervisor determines if modification of the trace parameters is required. If the modification of the trace parameters is required, the hypervisor alters the trace parameters in anticipation of another trace event.

The above, as well as additional purposes, features, and advantages or the present invention will become apparent in the following detailed written description.

BRIEF DESCRIPTION OF THE FIGURES

The novel features believed characteristic of the invention or set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

Figure 1:
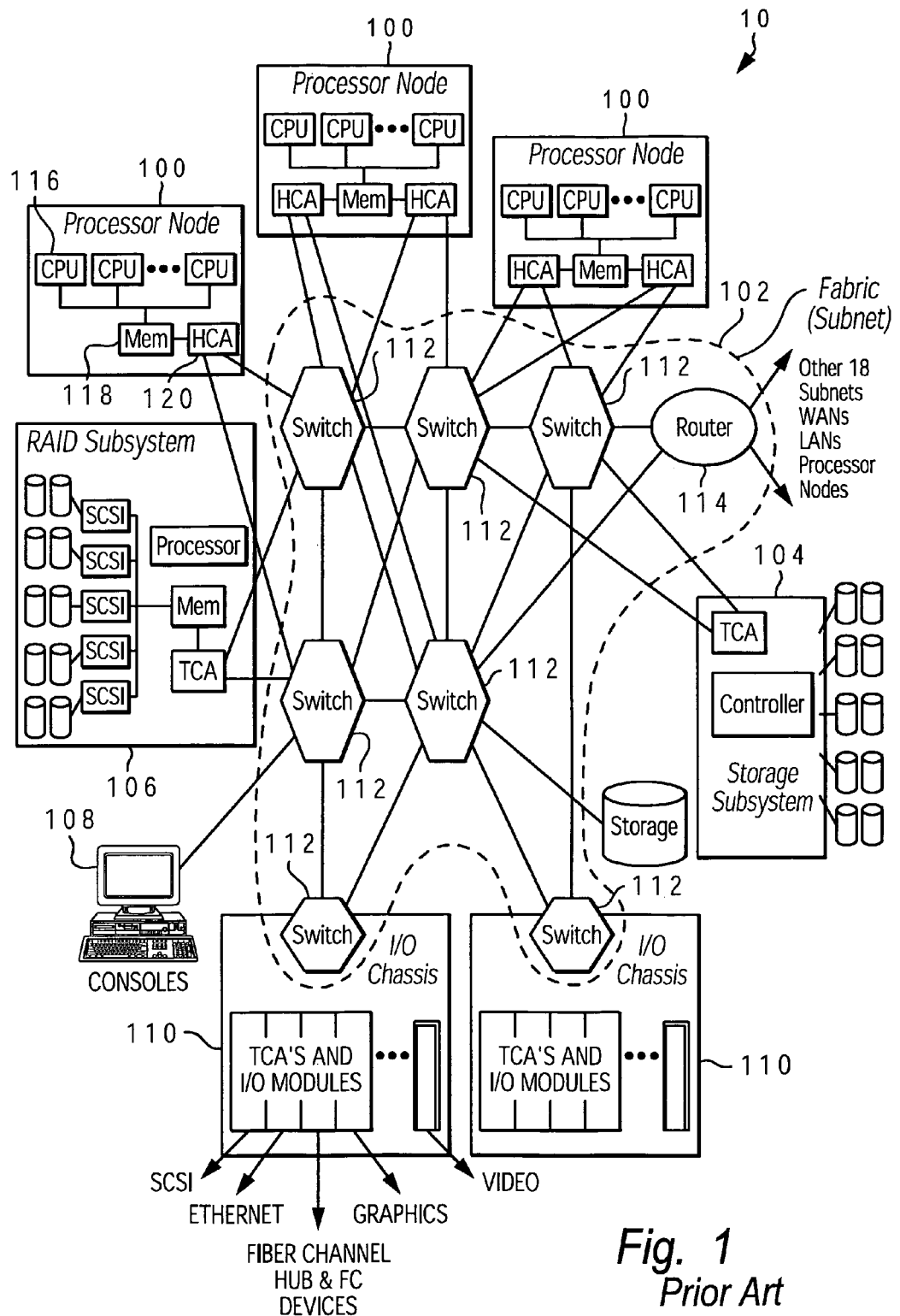
FIG. 1 is a block diagram illustrating an InfiniBand system in which a preferred embodiment of the present invention may be implemented.

Referring to FIG. 1, there is illustrated an InfiniBand system 10 in which a preferred embodiment of the present invention may be implemented. As referenced in the InfiniBand Architecture Specification by the InfiniBand Trade Association, Release 1.0.a, an InfiniBand system 10 utilizes work queue pairs (QPs) and completion queues (CQ). QPs and CQs enable nodes within system 10 to communicate. For one node to execute an operation, the node creates a work queue element (WQE) and places the WQE in the work queue. From the work queue, the work queue element is picked up by a channel adapter, like host channel adapter (HCA) 120. Once the WQE has been completed, a completion queue entry (CQE) is created and placed on the completion queue.

As illustrated InfiniBand system 10 includes multiple processor nodes 100 interconnected through a fabric network 102 to, for instance, a Storage Subsystem 104, a redundant array of independent disks (RAID) Subsystem 106, Consoles 108, and multiple I/O Chassis 110 through which are connected small computer system (SCSI) devices, Ethernet connections, Fibre Channel (FC) Hub and FC devices, Graphics and Video devices. Fabric 102 includes multiple switches 112 and routers 114 such that messages and data may be exchanged over the InfiniBand system 10. Each processor node 100 includes one or more central processor units (CPU) 116, a memory 118, and a Host Channel Adapter (HCA) 120.

HCA 120 includes trace registers 124 for storing data and controls associated with a trace and transmit receive trace buffers 128*a-n* for buffering data from traces prior to sending the data to the respective requesting logical partitions 199.

"Completion events" include, but are not limited to, instances when a program-initiated work request, as identified by a work-queue entry (WQE) in a QP, is completed by HCA 120. A completion event may be recognized and a completion-queue entry is recorded in the CQ associated with the QP.

Figure 2:
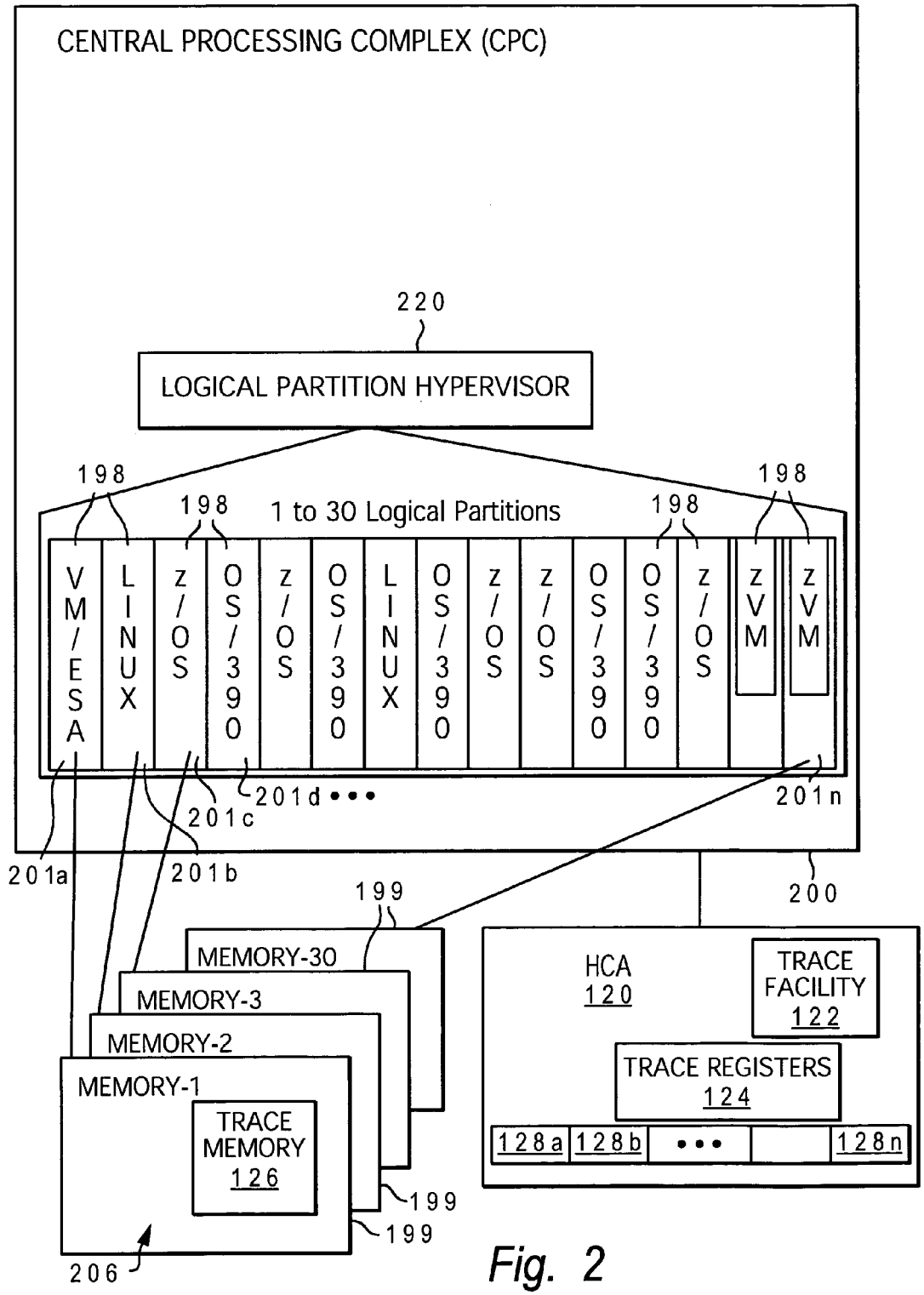
FIG. 2 is a block diagram depicting an exemplary central processor complex in which a preferred embodiment of the present invention may be implemented.

FIG. 2 is a block diagram illustrating a central processor complex (CPC) 200 of one of processor nodes 100 depicted in FIG. 1. CPC 200 includes CPC memory 118 and at least one of the central processing units (CPUs) 116 illustrated in FIG. 1. CPC 200 is coupled to HCA 120. Also, CPC 200 includes a hypervisor 220 that divides CPC memory 118 among multiple logical partitions 198. Each logical partition 198 includes a partition memory 199 that is part of memory 118. Each partition memory 199 for logical partitions 198 includes an operating system 201a-n. Hypervisor 220 access a trace facility 122 located in HCA 120, discussed herein in more detail in conjunction with FIG. 3. Partition memory 119 also includes a trace memory 126a-n, discussed herein in more detail in conjunction with FIG. 3.

Figure 3:
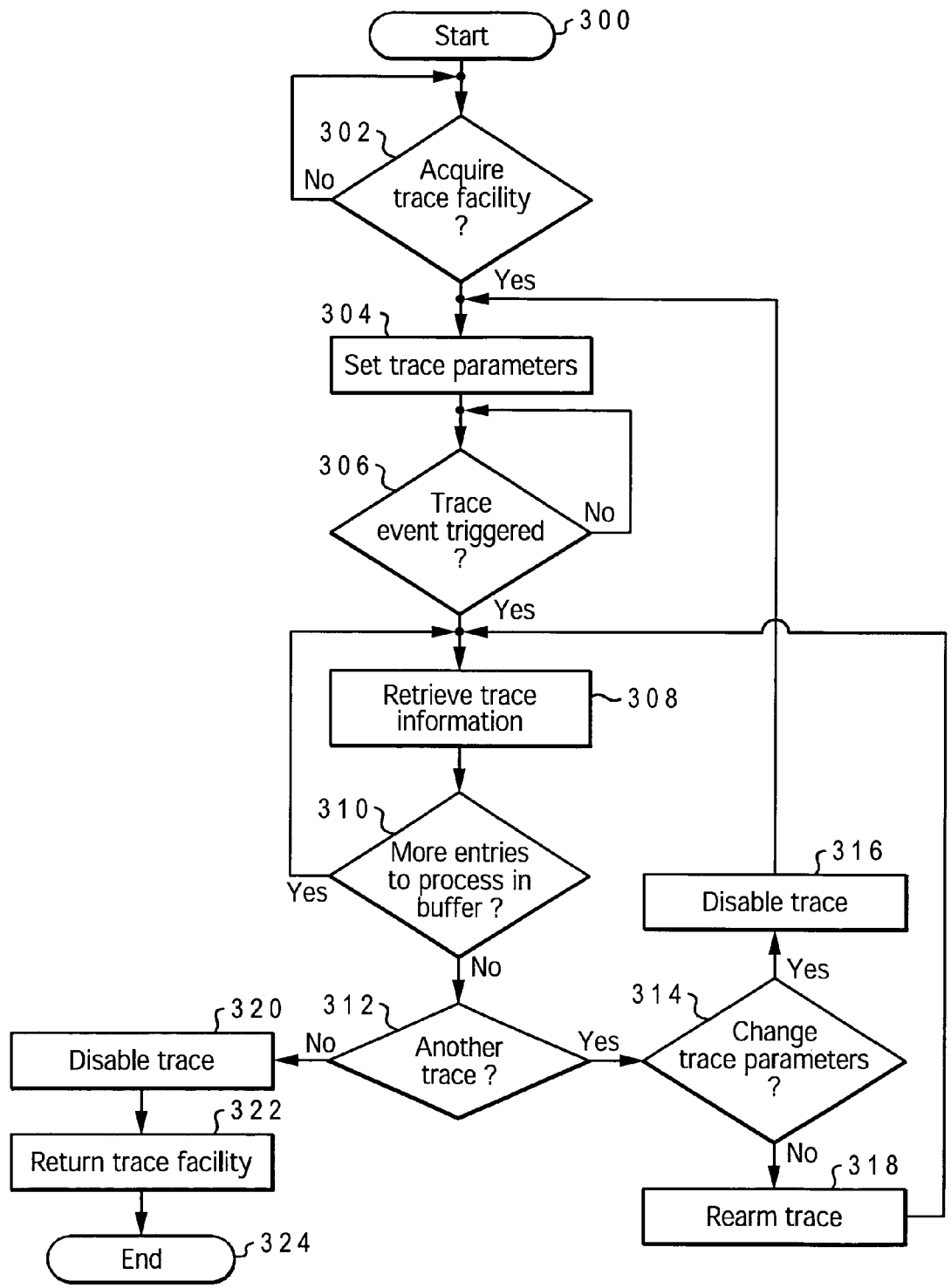
FIG. 3 is a high-level logical flowchart diagram illustrating an exemplary method for supporting debugging of host channel adapters (HCA) in a logical partitioning environment according to a preferred embodiment of the present invention.

FIG. 3 is a high-level logical flowchart diagram illustrating an exemplary method for supporting debugging of host channel adapters in a logical partitioning environment according to a preferred embodiment of the present invention. The process begins at step 300 and proceeds to step 302, which illustrates an operating system 201a-n attempting to acquire a tracing facility within HCA 120 (utilizing a H_MANAGE_TRACE command).

Acquiring a tracing facility (e.g., tracing facility 122) provides access to transmit and receive buffers 128a-n of each of the ports in HCA 120. If tracing facility 122 is not available in HCA 120 when a tracing facility is being acquired by an operating system 201a-n, a return code is set to a "resource-in-use" condition. If tracing facility 122 is available in HCA 120, the tracing facility is marked as "in-use" by the logical partition, which includes operating system 201a-n, invoking the acquiring of tracing facility 120. The return code is set to the "successful-completion" condition. If the tracing facility is not acquired, the process iterates at step 302.

If tracing facility 120 is acquired, the process continues to step 304, which illustrates hypervisor 220 set tracing parameters utilized to specify tracing filters and events that will trigger or stop a trace. The process continues to step 306, which depicts hypervisor 220 determining if a trace event has been triggered. If a trace event has not been triggered, the process iterates at step 306.

If a trace event has been triggered, the process continues to step 308, which illustrates hypervisor 220 retrieving trace information from HCA trace buffers 128a-n and sending the data to trace buffer 126 utilizing an H_GET_TRACE_BUFFER command, which retrieves either the receive or transmit trace buffer for the specified port and stores the contents in a designated storage location. In a preferred embodiment of the present invention, up to 4 K bytes of data are returned until the buffer size is exceeded. Those with skill in the art will appreciate that the present invention may include any amount of data returned and is in no way limited to the aforementioned 4 K bytes. If there are more entries within HCA trace buffer 128a-n to process (a return code is set to a "partial-trace-buffer-stored condition), the process returns to step 308. However, if there are no more entries within HCA trace buffer 128a-n to process (a return code is set to a "successful completion" condition), the process continues to step 312, which depicts hypervisor 220 determining if another trace is to be performed. If there are no more traces to be performed, the process proceeds to step 320, which illustrates hypervisor 220 disable tracing, which is utilized to stop a trace or to disable a trace in preparation of a change in trace parameters.

The process continues to step 322, which depicts hypervisor 220 returning trace facility 122 to HCA 120. When tracing facility 122 is being returned, a return code is set to an "invalid-trace-buffer-owner" condition without further processing, if the tracing facility has not been previously assigned. If the tracing facility has been previously assigned to the logical partition invoking the return function, the tracing facility assigned to the invoking logical partition is released and becomes available for utilization by other partitions. All tracing controls in HCA 120 are cleared and the return code is set to a "successful completion" condition. The process ends, as illustrated in step 324.

Returning to step 312, if there are more traces to be performed, the process continues to step 314, which illustrates hypervisor 220 determining if a change in trace parameters is required. If a change in trace parameters is required, the process continues to step 316, which illustrates hypervisor 220 disabling the trace function and the process returns to step 304 and proceeds in an iterative fashion.

Returning to step 314, if there are no changes in the trace parameters necessary, the process continues to step 318, which illustrates hypervisor 220 rearming the trace function and the process returns to step 308 and proceeds in an iterative fashion.

As discussed, the present invention includes a A method, system, and computer-usable medium for supporting debugging of host channel adapters in a logical partitioning environment. In a preferred embodiment of the present invention, a hypervisor acquires control of a trace facility and sets trace parameters for the host channel adapter. In response to determining a trace event that matches said trace parameter has been triggered, the hypervisor retrieves trace information from a buffer. In response to determining the buffer does not include any more trace information, the hypervisor determines if modification of the trace parameters is required. If the modification of the trace parameters is required, the hypervisor alters the trace parameters in anticipation of another trace event.

It should be understood that at least some aspects of the present invention may alternatively be implemented in a computer-usable medium that contains a program product. Programs defining functions on the present invention can be delievered to a data storage system or a computer system via a variety of signal-bearing media, which include, without limitation, non-writable storage media (e.g., CD-ROM), writable storge media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDAs), telephones, and any other system capable of processing, transmitting, receiving, capturing and/or storing data.

What is claimed is:

1. A computer-implementable method comprising:
   acquiring control of a trace facility for debugging a host channel adapter implemented in a logical partitioning environment;

setting trace parameters for said host channel adapter;

in response to determining a trace event that matches said trace parameters has been triggered, retrieving trace information from a buffer;

in response to determining said buffer does not contain any more said trace information, determining if modification of said trace parameters is required;

in response to determining modification of said trace parameters is required, altering said trace parameters in anticipation of another said trace event;

in response to determining modification of said trace parameters is not required, rearming said trace facility for a subsequent trace;

in response to determining a subsequent trace is required, rearming said trace facility for said subsequent trace;

in response to determining a subsequent trace is not required, disabling said trace facility; and in response to determining said trace facility is not available, returning an "in-use" condition to a logical partition invoking use of said tracing facility.

* * * * *